Dec. 17, 1968  G. P. CANEVARI ET AL  3,417,015
COALESCER AND SEPARATOR FOR OILY WATER
Filed Nov. 22, 1966  2 Sheets-Sheet 1
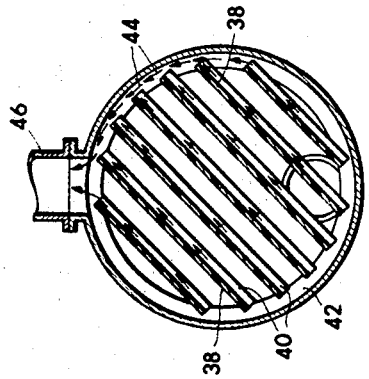
FIG. 3
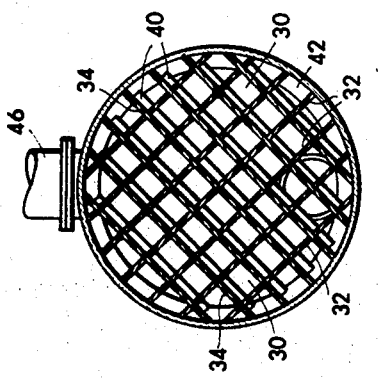
FIG. 2
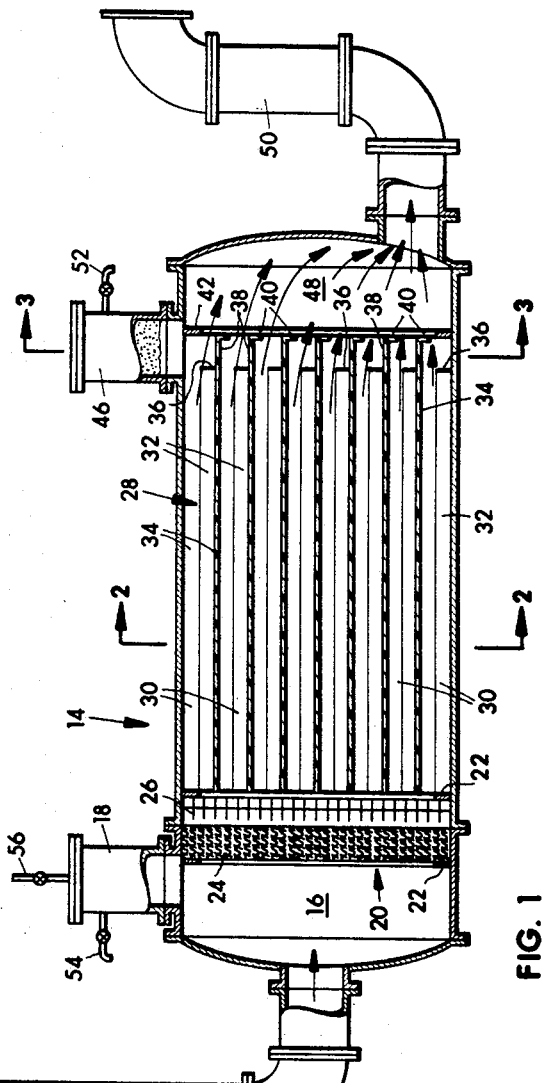
FIG. 1
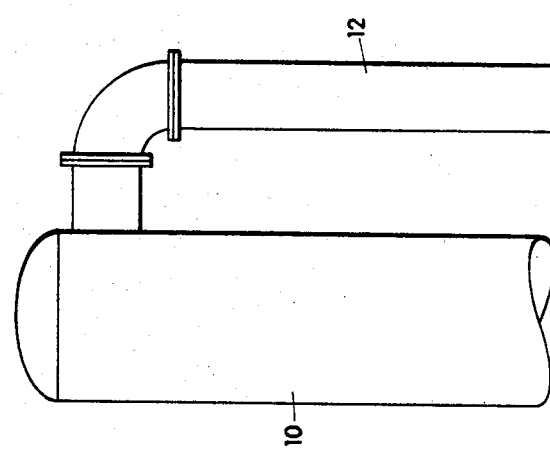
G. P. Canevari
R. J. Fiocco
INVENTORS
BY Donald F. Wohlers
PATENT ATTORNEY Dec. 17, 1968    G. P. CANEVARI ET AL    3,417,015
COALESCER AND SEPARATOR FOR OILY WATER
Filed Nov. 22, 1966    2 Sheets-Sheet 2

G. P. Canevari
R. J. Fiocco    INVENTORS

BY Donald F. Wohlers
PATENT ATTORNEY

United States Patent Office 3,417,015
Patented Dec. 17, 1968

3,417,015
COALESCER AND SEPARATOR FOR OILY WATER
Gerard P. Canevari, Cranford, and Robert J. Fiocco, Springfield, N.J., assignors to Esso Research and Engineering Company, a corporation of Delaware
Filed Nov. 22, 1966, Ser. No. 596,185
11 Claims. (Cl. 210—23)

ABSTRACT OF THE DISCLOSURE

A separator employing a coalescing cartridge having a low pressure drop transforms small diameter oil droplets into larger droplets capable of gravity separation in an adjacent downstream honeycomb of further coalescing and settling ducts. A bubble rupturing screen is positioned between the coalescing cartridge and the ducts.

---

This invention relates in general to separators and in particular to an improved apparatus and method for separating fine droplets of oil from an oil-in-water suspension. The invention is especially useful in removing the oil from an oil-in-water suspension containing a relatively minute amount of oil in finely dispersed form. The invention, also, relates to a low pressure drop, high efficiency, oil coalescing device of minimum volume for its separating capacity.

In various industrial operations, efflux streams are obtained which comprise water containing a relatively minute amount of oil in finely dispersed form. These finely disposed oil droplets are not readily subject to gravity separation and are characteristic of effluxes from conventional gravity separators. For example, it is not uncommon that the water flowing from a gravity separation system contains well over 200 p.p.m. of oil, whereas it may be desirable or necessary to meet government or international regulations that the water efflux to rivers or oceans have an oil content less than, say, 100 p.p.m.

The removal of these last small and minute quantities of dispersed oil in suspension without incurring excessive costs has heretofore presented a difficult problem to the oil refiner. Many coalescing devices have been made for this final stage oil separation which have been excessively large in size and cost. Other devices have been made, that while small in size, require the frequent replacement of a filter cartridge having a high pressure drop therethrough thereby preventing gravity flow operations of the separator.

It is, therefore, the principal object of the present invention to substantially reduce the size and increase the efficiency of prior art separators and in particular to provide a unit which does not incur a large pressure drop upon the flowing stream requiring forced pumping of the stream therethrough.

In particular, the present invention includes a coalescing cartridge having a low pressure drop characteristic composed of a knitted web of lipophilic fibers which have been spooled up in a spirally wrapped disc. This coalescing cartridge is oriented relative to the flow of the stream so that a minimum pressure drop to the stream occurs. The cartridge of knitted fibers which may be made of any suitable material, such as polypropylene, is of relatively open mesh that permits maximum droplet growth without associated plugging by solids that also may be flowing in the stream. The larger size oil droplets emerging from the downstream side of the coalescing cartridge pass, along with the flowing water, into a second stage settling chamber. This chamber extends horizontally and includes a plurality of relatively small cross-sectional area passageways or ducts, the walls of which are also preferably made of oil-wettable material such as polypropylene. The surfaces of each of these secondary duc act as a secondary coalescer for the larger size oil dro lets flowing from the cartridge and simultaneously ther with act as a first stage or preliminary gravity settlir tank. As any single droplet that enters the inlet end of particular duct is carried to the opposite end of th duct, it will rise due to gravity separation and colle upon the upper or side wall surfaces of the duct. Becau the cross-section area of this duct is relatively small, an one particular oil droplet will get out of the water strea and stick to a surface sooner than would be the case ha the construction required an oil droplet to rise from lower portion of the settling chamber all the way to th top thereof. These small cross-sectional area passagewa) of the settling chamber also function to prevent turbulei flow at high flow rates in this preliminary gravity settlin chamber. Obviously, it is highly desirable to prever turbulent flow in an area where gravity separation is t occur.

At the discharge end of each of the passageways, th oil collected on the upper duct surfaces is transferred t an inclined plate co-planer with the upper wall of eac of the ducts. The terminal edge of this extending plat portion is provided with an oil-arresting lip which pr( vents further horizontal flow of the collected oil whil permitting the continued horizontal flow of the primar water stream. Each of the inclined plate portions is effec tive to direct the oil film on the under side therec obliquely upward to the adjacent outer wall of the settlin chamber casing along which it rises gradually to an uppe oil collection trap.

Accordingly, it is a principal object of this inventio to provide an improved small size and high capacit coalescer for dispersed fine droplets of oil.

Another object of the invention is to provide a hig efficiency, low pressure drop coalescer.

Another object of the present invention is to provid novel gravity settling chamber means including a plura ity of ducts to shorten the gravity separation distance decrease turbulence, and to provide additional coalescin surface.

Another object of the invention is to simultaneousl coalesce and gravity separate in the second stage settlin chamber of the invention.

Another object of the invention is to provide an im proved coalescing cartridge having a coiled web of knitte lipophilic fibers in combination with a rupturing mean for severing large diameter oil-surfaced water bubble emerging from the down-stream side of the coalescin cartridge.

These and other objects and advantages of the inven tion will become apparent and the invention will be full understood from the following description and drawing: in which:

FIG. 1 is a side elevation view of the invention, show ing portions thereof in cross-section;

FIG. 2 is a cross-sectional view taken along line 2—: of FIG. 1 showing the passageways in greatly enlarge( scale;

FIG. 3 is a cross-sectional view similar to FIG. 2 takei along line 3–3 of FIG. 1;

Figure 9:
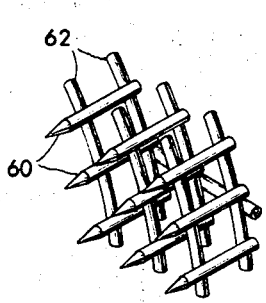

FIG. 9 is an enlarged, perspective view of a portioi of the bubble severing means; and 10a, 10b, and 10c show the coalescing operation
...nd of fiber used in the coalescing cartridge.
...l be understood that the above described draw-
...strate merely a representative embodiment of
...ntion and that other embodiments are contem-
...vithin the scope of the claims hereinafter set ...ring to the drawings in particular, a preliminary
...separator 10 is shown, fragmentarily discharging
...a conduit 12 into an inlet chamber 16 of the
...r unit generally indicated at 14. It will be appre-
...at the preliminary separator 10, while perform-
...nitial rough cut separation, is not necessary for
...ration of applicants' invention where an inlet
...s provided having a relatively low amount of oil
therein. However, applicants' high efficiency, low
...drop coalescer is particularly suitable for increas-
...ultimate discharge performance of prior art sep-
...such as the one schematically illustrated at 10,
...o not produce results compatible with many gov-
...established clean water standards.
...tream of liquid entering the inlet chamber 16 will
...rstood to carry the majority of its oil content in
...spersed small droplets which do not readily lend
...ves to gravity separation even over long settling
...However, in instances where an occasional large
...oil enters the chamber 16 or where air bubbles
...introduced therein, they may readily rise to the
...hamber 16 into an air accumulation trap 18. One
...the chamber 16 is defined by a coalescing car-
...0. The cartridge 20 includes a first-stage mesh
...which may be made of polypropylene forming a
...ng medium 24, and a second-stage bubble ruptur-
...en designated 26. The cartridge is maintained
...he casing of the coalescer unit by a pair of re-
...ings 22. Adjacent and downstream of the bubble
...g screen 26, a settling chamber 28 is provided
...lurality of elongated, horizontally extending ducts
...h serve as intermediate settling chambers. The
...l and the corresponding ducts 76 of FIG. 4 for
...s of illustration are shown in enlarged cross-
...l scale. However, it should be understood that
...actual coalescer unit the ducts are of approxi-
...one inch in width and height, while the diameter
...asing for the settling unit is approximately four
...may be seen best in FIG. 2, each of the ducts 30
...d by a pair of side wall portions 32 and a top
...tion 34. These wall portions cooperate with the
...portion 34 of an adjacent duct to form a gen-
...ctangular passageway which extends horizontally
...e settling chamber to a point where the side wall
...32 terminate along a downstream edge desig-
...5. As may be seen best from FIGS. 1, 2, and 3,
...wall portion 34 of each duct 30 extends hori-
...beyond the terminal edge 36 of the side walls
...e an overhanging portion or ledge 38. Each of
...hanging portions 38 includes a downwardly pro-
...oil-arresting lip 40 which is effective to prevent
...horizontal flow of the oil accumulation moving
...e upper underneath side of each of the top walls
...rring to FIG. 3, it should be noted that the width
...of the extending portions 38 is slightly less than
...rnal dimension of the cylindrical casing of the
...is permits the separated oil that flows from the
...each individual duct 30 to travel upwardly along
...ned underside of the overhanging portion 38 into
...lar oil collection chamber 44. This oil collection
...44 is defined at its downstream edge by an an-
...ng 42. The oil flowing off the uppermost side
...the overhanging portions 38 arises upwardly to
...e surface of the casing and progresses upwardly
...oil trap portion 46. The oil trap 46 is provided
...uitable oil outlet tap 52 while the air accumulation
...is provided with a similar oil tap 54 and an upper
air vent 56.

The flowing stream of water emitted from the respective ends of each of the ducts 30 traverses the under side of each of the depending lips 40 into an outlet chamber 48 which communicates through a lower portion thereof into a water outlet conduit 50.

Figure 6:
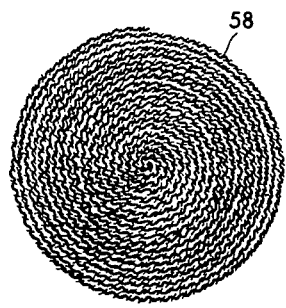
FIG. 6 is an end-view of the coalescing cartridge.
Figure 7:
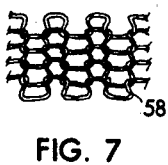
FIG. 7 is an enlarged, fragmentary view of a sectioi of the knitted web used in the coalescing cartridge o FIG. 6.
Figure 8:
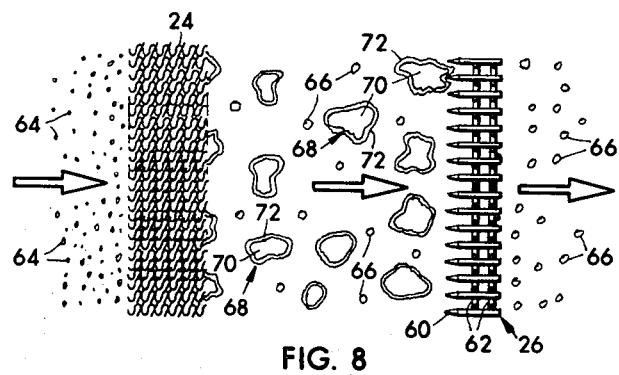
FIG. 8 is an exploded, diagrammatic view of the coa lescing cartridge and bubble severing means schemati cally showing the operation thereof.

Referring specifically to FIGS. 7 through 10, a better understanding of the operation of the coalescing cartridge 20 may be had. The web of coalescing medium is shown in FIG. 7 to be of a knitted configuration which is of a predetermined width equal to the desired horizontal width of the cartridge. The web is spirally wrapped preferably in a relatively loose fashion into a cylindrical disc as shown in FIG. 6, corresponding in outside diameter to the inside diameter of the coalescer casing. In one form of the invention, the specific tightness of the knit 58 and spiral wrapping was selected to produce a cartridge of 6 inch depth having approximately 80% void volume to minimize the pressure drop of the cartridge and also to provide optimum oil droplet growth therein without associated solid plugging of the cartridge. In instances where high pressure drop and solids plugging is of no or little consequence, the tightness of the cartridge may be increased to improve coalescing performance. On the other hand, when solids plugging may be a problem, both void volume and cartridge depth may be increased to limit plugging without sacrificing coalescing efficiency. If excessive solids plugging is experienced, a prefiltering device may also be used upstream of the coalescer. Downstream of the coalescing medium 24 is provided a similar cylindrical, disc-like spiral array of pointed wires 60 which are secured to mounting wires 62. In operation, these pointed wires 60 are effective to rupture any unusually large, oil-surfaced water bubbles which may form on the discharge side of the coalescing medium 24 at high throughput rates. This operation of the bubble severing means may best be seen by the schematic presentation of FIG. 8 wherein the fine oil droplets 64 are seen on the upstream side of the cartridge. The droplets 64 are coalesced into larger sized oil droplets designated 66. Because of the relatively open mesh nature of the coalescing cartridge 24, and the relatively high flow rate of the fluid stream therethrough, there is a tendency to create large diameter, oil filmed bubbles designated 68. These water-in-oil bubbles 68 have a center portion 70 of water and a very thin oil film, outer layer 72. The pointed wires 60 are effective to sever or rupture these undesirable water-in-oil bubbles 68 and, upon their collapse, additional large coalesced oil droplets 66 are produced on the downstream side of the rupturing screen 26.

Figure 10A:
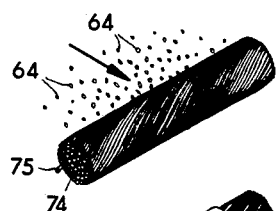
Figure 10B:
Figure 10C:
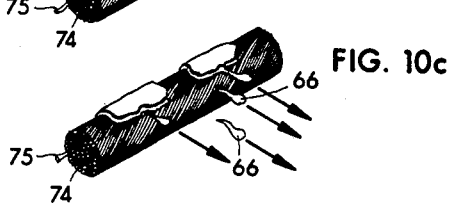

Referring to FIGS. 10a, 10b and 10c, a better appreciation of the coalescing action of an individual strand of the web may be had. In FIGS. 10a–c, an individual strand 74 of the web 58 is shown as being composed of a plurality of individual fibers or filaments. While applicants' invention is described herein as preferably having a multifilament strand, it will be appreciated that a single, monofilament strand may also be used. If desired, the strand 74 may also include a metal wire 75 to increase its stiffness and resistance to compacting. In FIGS. 10a, b and c, it may be seen how a plurality of fine oil droplets 64 gradually accumulate on the periphery of strands 74 and form an oil film thereon. As this oil film or layer grows to a sufficient thickness and size, larger size droplets will be broken off from the downstream portion thereof which are more readily gravity separated.

Figure 4:
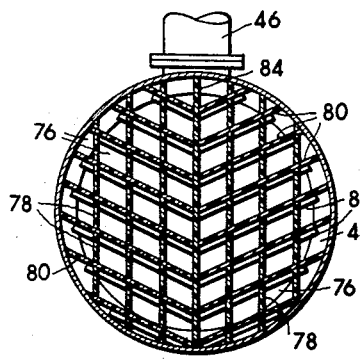
FIGS. 4 and 5 are cross-sectional views similar t( FIGS. 2 and 3 of another form of the invention.
Figure 5:
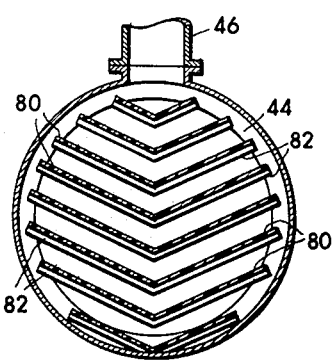

In FIGS. 4 and 5, an alternate arrangement for the ducting of the settling chamber is disclosed. Specifically, the settling chamber includes a plurality of elongated ducts 76 having side wall portions 78 and a top wall portion 80. The ducts on the respective right and left-hand sides of the center partition wall 84 discharge the oil film layer on the under side of their upper walls in much the same fashion as the ducts 30 of the previous embodiment to an extending or overhanging portion having an oil-arresting lip 82 at the end thereof. Oil thus collected by the arresting lip 82 will progress upwardly to the edge thereof and into the annular chamber 44 adjacent the inner wall of the casing as shown in FIG. 5. In this embodiment, the settling chamber has been divided vertically by the partition 84 to provide a dual path for the accumulation of the coalesced and settled oil droplets upwardly to the oil trap 46.

With the foregoing described arrangements, it may readily be seen how applicants have provided a new and novel coalescing cartridge which may be either monofilament or multifilament fiber of preferably polypropylene, polyethylene, or other similar lipophilic materials. The woven and spirally wrapped arrangement and orientation of the coalescing cartridge is such to provide a minimum pressure drop to the liquid with a corresponding absence of plugging. However, in a sense, the coalescing cartridge also acts as a distributor before the settling ducts. Therefore, some pressure drop is unavoidable. The mesh can be wound to the proper tightness for the specific application. The larger oil droplets produced by applicants' coalescing cartridge are passed to a subsequent compartmentized settling chamber which includes closely spaced baffles to allow for a compact design. The close spacing of both the horizontal and vertical baffles defining each of the compartmentized ducts decreases the individual settling distance required for a particular coalesced oil droplet and functions to maintain more laminar flow in the settling zone which is important for minimum settling time and optimum performance. This compact design and low pressure drop makes the coalescer-separator unit particularly suitable for marine use where installation space requirements are limited, and the ship may be subject to rolling and pitching movements. Applicants' design is approximately one-quarter the size of comparable designs commercially available on the market and has a higher separation rate than competitive units. In practice, a unit having a capacity of 300 tons per hour, or in other words, 1,200 gallons per minute, and a pressure drop of less than 2 p.s.i. has been constructed with a diameter of four feet and a length of ten feet. This high performance capability is often without recourse to pressure feed whatsoever because of the low pressure drop experienced in the coalescing cartridge having a relatively high percentage void area in the range of eighty percent.

In the above-described dimensions and the flow rate of 300 tons per hour, a superficial velocity through the coalescing cartridge of approximately 100 g.p.m. per square foot is obtained. This means that for any one particular coalesced oil droplet 66 entering the inlet end of any particular duct 30, its residence time within that duct will be approximately one-half minute if the duct length is approximately seven feet. It has been found that droplets will settle out of approximately one-inch vertical height distance of an individual duct in this half-minute residence time within the duct at these flow rates. In prior art devices not employing a compartmentized settling chamber such as disclosed, the only alternative is to decrease the flow rates of any particular droplet therethrough or substantially enlarge the volume of the settling chamber to obtain equivalent output performance. Applicants' novel design has optimized the size versus flow rates to produce a new and low cost, high performance coalescing unit.

While two specific embodiments of the invention have been shown and described in detail to illustrate the application of the inventive principles, it will be understood that the invention may be embodied otherwise without departing from such principles.

What is claimed is:

1. Apparatus for separating dispersed fine droplets of a first liquid from a flowing stream of a second liquid which is of different density than and immiscible with the first liquid, comprising a bed of fibers for coalescing said fine droplets of the first liquid into larger size droplets more readily susceptible to subsequent gravity separation; and a settling chamber connected to receive the mixture of said first liquid and said second liquid emerging from said bed, said settling chamber including an outer casing member, wall means defining a plurality of elongated contiguous passageways extending horizontally through said casing member, each of said passageway acting as a preliminary settling chamber and at least one wall thereof acting as an additional coalescing surface for said larger size droplets, a plurality of inclined plate means at the discharge end of said passageways for collecting and directing the gravity separated and further coalesced larger sized droplets emerging from the discharge end of each of said passageways to the inner wall of said casing, each of said inclined plate means having a lip portion extending transverse to the horizontal fluid flow for arresting further horizontal flow of said first liquid while permitting substantially uninterrupted, continued horizontal flow of the second liquid, and means connected to a portion of said casing member for receiving the collected first liquid.

2. Apparatus in accordance with claim 1 wherein said fibers and said wall means are made of lipophilic material and said first liquid is a hydrocarbon.

3. Apparatus in accordance with claim 2 including a bubble severing means spaced downstream from said fiber bed intermediate said fiber bed and said settling chamber, said bubble severing means being effective to rupture large diameter oil surfaced bubbles of said second liquid forming downstream of said fiber bed.

4. Apparatus for separating dispersed fine droplets of oil from a flowing stream of water, comprising a knitted web of lipophilic fibers for coalescing said fine droplets of oil into larger size droplets more readily susceptible to subsequent gravity separation; and a settling chamber connected to receive the mixture of said oil and water emerging from said bed, said settling chamber including an outer casing member, top and side wall means defining a plurality of elongated contiguous passageways extending horizontally through and substantially filling said casing member, each of said passageways acting as a preliminary settling chamber, top wall means thereof being inclined to the horizontal at an angle between 10° and approximately 45° and acting as an additional coalescing surface for said larger size droplets, said top wall means extending downstream of said side wall means to define a plurality of plate means at the discharge end of said passageways for collecting and directing the gravity separated and further coalesced larger sized droplets emerging from the discharge end of each of said passageways to the inner wall of said casing, each of said inclined plate means having a lip portion extending transverse to the horizontal fluid flow for arresting further horizontal flow of said oil while permitting substantially uninterrupted, continued horizontal flow of oil-free water, and means connected to an upper portion of said casing member for receiving the collected oil.

5. Apparatus in accordance with claim 4 including bubble severing means spaced downstream from said lipophilic fibers intermediate said fibers and said settling chamber, said bubble severing means being effective to rupture large diameter oil surfaced bubbles of water forming downstream of said fibers.

6. Apparatus in accordance with claim 4 wherein said knitted web of lipophilic fibers comprises an elongated web approximately six inches in width, said web being spirally spooled to form a disc-like cartridge filling the inlet end of said casing member, said cartridge exhibiting a pressure drop of not more than 2 p.s.i. at fluid flow rates of 100 g.p.m./ft.$^2$.

7. Apparatus in accordance with claim 6 wherein each fiber of said web is composed of a plurality of individual monofilament strands.

8. Apparatus in accordance with claim 4 wherein said knitted web of lipophilic fibers includes a void areas of approximately 80% to thereby produce a pressure drop of less than 2 p.s.i. to fluids passing therethrough in a flow in parallel with the web width at rates of 100 ft.².

pparatus for separating dispersed fine droplets of liquid from a flowing stream of a second liquid s of different density than and immiscible with the uid, comprising first means for coalescing said fine s of the first liquid into larger size droplets more susceptible to subsequent gravity separation; and ig chamber connected to receive the mixture of said uid and said second liquid emerging from said first said settling chamber including an outer casing r, wall means defining a plurality of elongated con- passageways extending horizontally through said member, each of said passageways acting as a pre- y settling chamber and at least one wall thereof act- in additional coalescing surface for said larger size s, a plurality of inclined plate means at the dis- end of said passageways for collecting and direct- gravity separated and further coalesced larger sized s emerging from the discharge end of each of said ways to the inner wall of said casing, each of said plate means having a lip portion extending trans- the horizontal fluid flow for arresting further hor- flow of said first liquid while permitting substan- ninterrupted, continued horizontal flow of the sec- iid, and means connected to a portion of said cas- nber for receiving the collected first liquid.

he method for separating a mixture of dispersed plets of oil from a flowing stream of water com- the steps of first passing the mixture through a ng medium to produce larger size droplets of oil, reafter passing said mixture through a plurality of , horizontal and contiguous ducts which act to pre- bulent flow at high flow rates of said stream, further coalescing and gravity separating said oil droplets on the surfaces of said ducts as said flowing stream moves horizontally through said ducts, moving the coalesced oil droplets horizontally from one end of each duct to its opposite end, intercepting the horizontally flowing coalesced oil droplets as they leave the discharge end of each of said ducts, directing the coalesced and preliminary gravity separated oil transversely from the end of the duct and upwardly therefrom to a final gravity separation chamber, and continuing the flow of water in a horizontal direction outwardly from the end of said ducts.

11. The method in accordance with claim 10 including the additional step of severing larger diameter oil-surfaced bubbles of water emerging from the downstream side of said coalescing medium.

References Cited
UNITED STATES PATENTS

| | | | |
|---|---|---|---|
| 2,068,263 | 1/1937 | Burhans | 210—497 X |
| 2,405,838 | 8/1946 | Lawson et al. | |
| 2,425,235 | 8/1947 | Ferrante | 55—520 X |
| 2,731,150 | 1/1956 | McCann. | |
| 3,020,977 | 2/1962 | Huppke et al. | 55—520 |
| 3,034,656 | 5/1962 | Kasten. | |
| 3,231,091 | 1/1966 | Kingsbury et al. | |
| 3,256,997 | 6/1966 | Pall et al. | |
| 3,262,578 | 7/1966 | Dennis | 210—497 X |

REUBEN FRIEDMAN, *Primary Examiner.*

J. ADEE, *Assistant Examiner.*

U.S. Cl. X.R.

210—73, 83, 307, 497